United States Patent
Friedman

(10) Patent No.: US 6,176,649 B1
(45) Date of Patent: Jan. 23, 2001

(54) TOOLHOLDER

(75) Inventor: Jacob Friedman, Kfar Vradim (IL)

(73) Assignee: ISCAR Ltd., Migdal Tefen (IL)

( * ) Notice: Under 35 U.S.C. 154(b), the term of this patent shall be extended for 0 days.

(21) Appl. No.: 09/309,565

(22) Filed: May 12, 1999

(30) Foreign Application Priority Data

May 14, 1998 (IL) .................................................. 124496

(51) Int. Cl.$^7$ .................................................. B23B 27/16
(52) U.S. Cl. .............................. 407/110; 407/2; 407/117
(58) Field of Search .................................. 407/2, 3, 4, 5, 407/102, 107, 108, 109, 110, 50, 66, 100, 117; 83/845

(56) References Cited

U.S. PATENT DOCUMENTS

| | | | |
|---|---|---|---|
| 3,331,116 | * 7/1967 | Fussenhauser et al. | 407/3 |
| 3,934,320 | * 1/1976 | McCreery | 407/107 |
| 4,480,950 | * 11/1984 | Kraft et al. | 407/109 |
| 4,558,974 | 12/1985 | Pano . | |
| 4,580,930 | 4/1986 | Zinner . | |
| 4,938,640 | 7/1990 | Pano et al. . | |
| 5,022,796 | * 6/1991 | Pano et al. | 407/110 |
| 5,035,545 | 7/1991 | Zinner . | |
| 5,100,268 | * 3/1992 | Nakayama et al. | 407/109 |
| 5,100,269 | * 3/1992 | Lyon et al. | 407/107 |
| 5,156,502 | 10/1992 | Satran . | |
| 5,161,920 | 11/1992 | Zinner . | |
| 5,524,518 | * 6/1996 | Sundstrom | 83/845 |
| 5,685,672 | * 11/1997 | Tjernstrom | 407/108 |
| 5,697,271 | 12/1997 | Friedman et al. . | |
| 5,743,680 | 4/1998 | Von Haas et al. . | |
| 5,799,554 | * 9/1998 | Friedman et al. | 407/110 |
| 5,836,723 | * 11/1998 | Von Haas et al. | 407/107 |
| 5,947,648 | * 9/1999 | Friedman et al. | 407/5 |
| 5,993,118 | * 11/1999 | Brask et al. | 407/110 |

FOREIGN PATENT DOCUMENTS

| | | |
|---|---|---|
| 89 01 327 U | 2/1989 | (DE) . |
| 39 09 358 C1 | 3/1989 | (DE) . |
| 42 36 370 A1 | 10/1992 | (DE) . |
| 0 259 847 A1 | 9/1987 | (EP) . |
| 0 385 495 A1 | 3/1990 | (EP) . |

* cited by examiner

*Primary Examiner*—A. L. Wellington
*Assistant Examiner*—Erica Ergenbright
(74) *Attorney, Agent, or Firm*—Pennie & Edmonds LLP

(57) ABSTRACT

A toolholder (1) for clamping a cutting insert (6), the toolholder including a rigid base jaw (2), an upper clamping jaw (3) defining with the base jaw a longitudinally extending insert receiving slot for releasably receiving the cutting insert in a predetermined position, the upper clamping jaw tapering towards a leading nose portion (12) so shaped and dimensioned to initially urge the cutting insert to the predetermined position prior to its clamping in the insert receiving slot.

10 Claims, 4 Drawing Sheets ized; and

TOOLHOLDER

FIELD OF THE INVENTION

This invention relates to toolholders for releasably receiving one or more cutting inserts.

BACKGROUND OF THE INVENTION

In U.S. Pat. No. 4,580,930 to Zinner, there is illustrated and described a toolholder having a rigid base jaw and a tapering clamping jaw defining a longitudinally extending insert receiving slot for releasably receiving a cutting insert which is clamped therein by a clamping force transversely directed to its major clamping surfaces. Irrespective of how tightly a cutting insert is clamped in an insert receiving slot, it can be undesirably and forcibly extracted therefrom during a cutting operation by outwardly directed unseating forces acting co-directional with the slot. To prevent such unseating, the toolholder is provided with a stopping member (28) received in a recess (27) formed in the cutting insert's lower clamping surface (see FIG. 12). However, this complicates the toolholder's construction and requires suitably formed cutting inserts.

SUMMARY OF THE INVENTION

In accordance with the present invention, there is provided a toolholder for clamping a cutting insert, the toolholder comprising:

a rigid base jaw, an upper clamping jaw tapering towards a leading nose portion, said base jaw and said clamping jaw defining therebetween a longitudinally extending insert receiving slot for releasably receiving the cutting insert in a predetermined position, a stopping member for engaging an auxiliary clamping surface of the cutting insert to prevent its outward longitudinal displacement from said predetermined position during a cutting operation, characterized in that said stopping member being constituted by said leading nose portion so shaped and dimensioned to initially urge the cutting insert to said predetermined position prior to its clamping in said insert receiving slot.

In accordance with the present invention, a clamping jaw's leading nose portion initially urges a cutting insert inward to its predetermined position in an insert receiving slot prior to its otherwise conventional clamping and thereafter it reacts against the outwardly directed unseating forces prevailing during a cutting operation to positively secure the cutting insert in its predetermined position. Such clamping necessarily involves elastic deformation of substantially the entire clamping jaw which in turn entails that its leading nose portion also undergoes elastic deformation from an initial unclamping state to a final clamping state.

By virtue of the present invention, the proposed modification to an otherwise conventional toolholder facilitates the secure clamping of preferably conventional double ended cutting inserts. In addition, the proposed modification to an otherwise conventional toolholder can be readily implemented.

BRIEF DESCRIPTION OF THE DRAWINGS

For a better understanding of the different aspects of the present invention and to show how the same can be carried out in practice, preferred embodiments will now be described, by way of non-limiting examples, with reference now made to the accompanying drawings, in which.

DETAILED DESCRIPTION OF PREFERRED EMBODIMENTS

Figure 1:
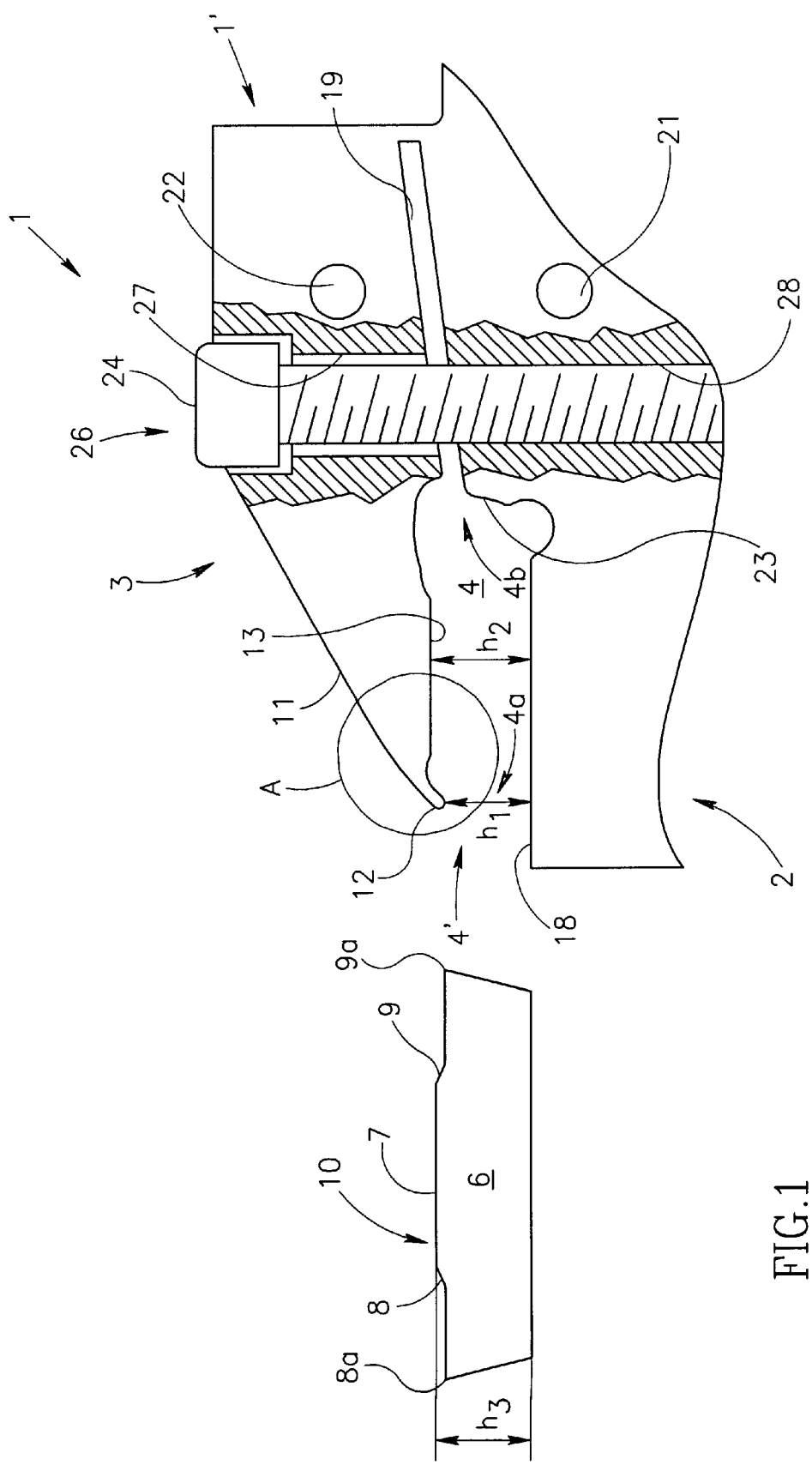
FIG. 1 is a partial side view of a toolholder according to the present invention before clamping a cutting insert.
Figure 2:
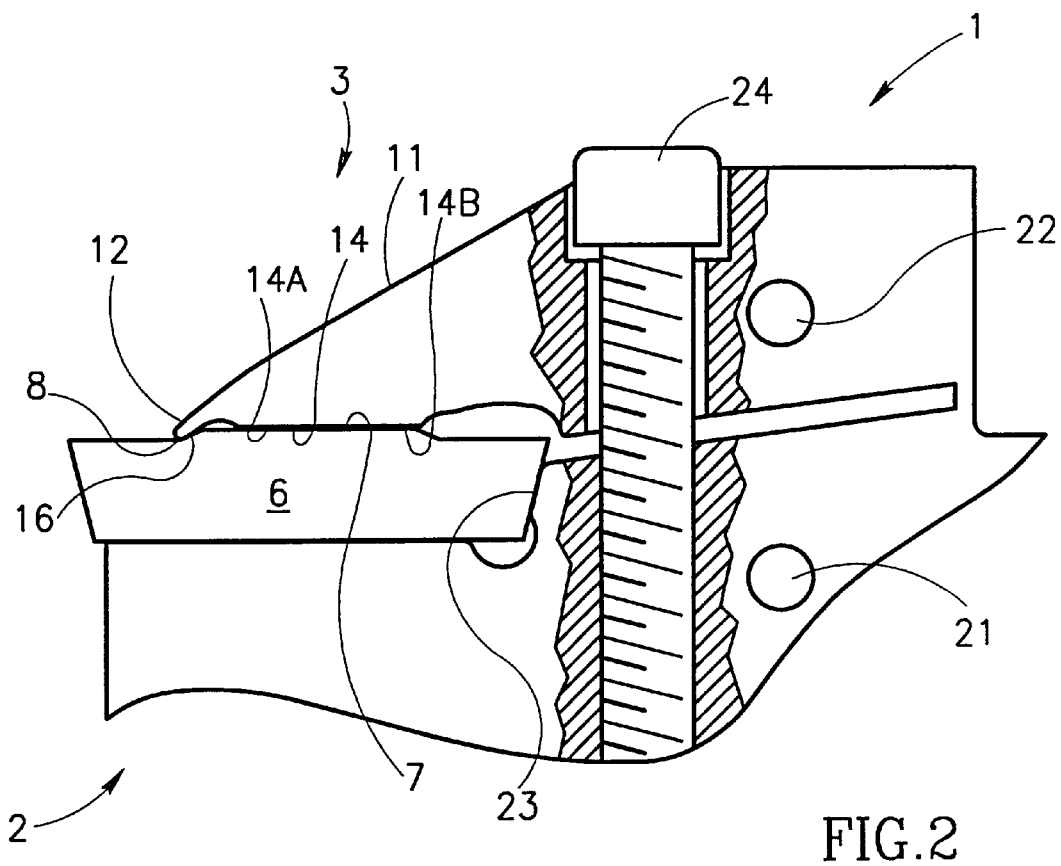
FIG. 2 is a partial side view of the toolholder of FIG. 1 after clamping a cutting insert.

With reference to the drawings, FIGS. 1 and 2 show a toolholder 1 comprising a jaw member 1' having unitary construction with a rigid base jaw 2 and an upper clamping jaw 3 defining a longitudinally extending insert receiving slot 4 for receiving a double ended cutting insert 6, for example, as illustrated and described in U.S. Pat. No. 5,156,502. The cutting insert 6 has an upper surface 10 which comprises has a central upper major clamping surface 7, a leading inclined auxiliary clamping surface 8 and a trailing inclined auxiliary clamping surface 9. As seen in FIG. 1, the auxiliary clamping surfaces 8, 9 are inclined in opposite senses and separate the upper major clamping surface 7 from corresponding front cutting edges 8a, 9a, respectively.

Figure 3:
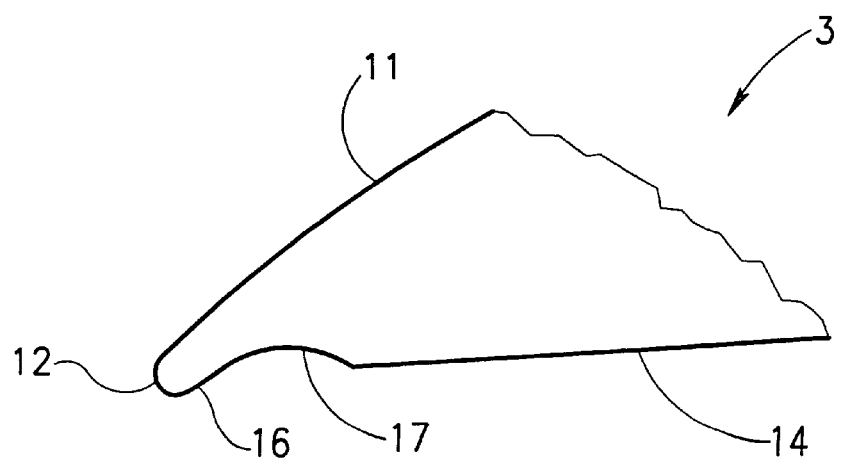
FIG. 3 is an enlarged side view of the leading nose portion of the toolholder's clamping jaw designated A in FIG. 1.

The upper clamping jaw 3 has a tapering major leading portion 11 terminating in a leading nose portion 12 constituting a stopping member of the toolholder 1. The upper clamping jaw 3 has an underside surface 13 with a major component surface 14 associated with the major leading portion 11 and a minor component surface 16 associated with its leading nose portion 12, the major and minor component surfaces 14 and 16 being separated by a longitudinally extending recess 17 (see FIG. 3) and respectively adapted to abut against the cutting insert's major clamping surface 7 and auxiliary clamping surface 8.

The major component surface 14 is substantially co-directional with the base jaw's upperside surface 18 and in practice is slightly rearwardly diverging at an angle of about 1° such that its leading portion 14A contacts the cutting insert's clamping surface 7 before its trailing portion 14B during the clamping of the cutting insert 6. The minor component surface 16 is forwardly and downwardly directed with respect to the major component surface 14 towards the base jaw's upperside surface 18 at an obtuse angle necessarily less than the obtuse angle between the cutting insert's major clamping surface 7 and its auxiliary clamping surface 8. The height of a leading portion 4a of the insert receiving slot 4 is a minimum at the leading nose portion 12, namely, $h_1$ is less than $h_2$. Thus, $h_1$ defines the height of the insert opening 4' of the insert receiving slot 4.

In this case, $h_1$ is less than the cutting insert's height $h_3$, namely, the toolholder 1 is normally closed in the sense that it has to be opened for insertion of the cutting insert 6. Thus, the leading nose portion prevents insertion of the insert into the insert receiving slot 4, in the absence of a force enlarging the insert oppening 4'. The opening of the insert receiving slot 4 can be facilitated by, for example, an insert receiving slot opening key illustrated and described in U.S. Pat. No. 5,697,271, whose prongs are inserted in throughgoing bores 21 and 22 respectively formed in the base jaw 2 and the upper clamping jaw 3. Thus, upper clamping jaw 3 is resiliently displaceable relative to the rigid base jaw 2, upon application of a force. In order to reduce the opening force required to open the insert receiving slot 4, a rearward extension 19 is provided in the toolholder 1.

Figure 4A:
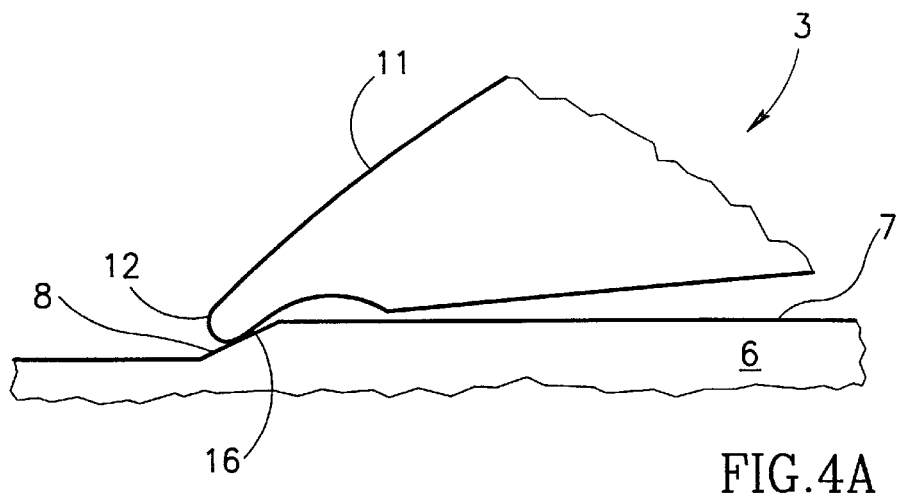
FIG. 4A is an enlarged side view of the leading nose portion of the toolholder of FIG. 1 before the clamping of a cutting insert.
Figure 4B:
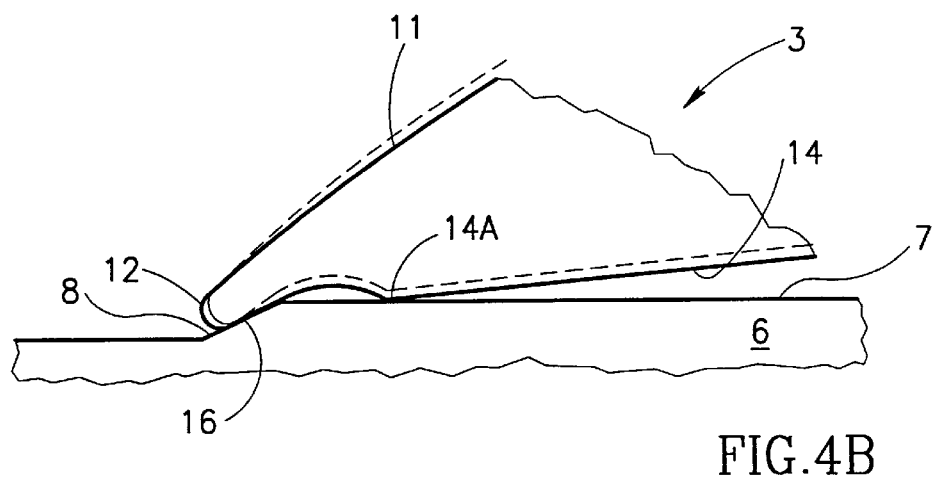
FIG. 4B is an enlarged side view of the toolholder's leading nose portion at an intermediate stage during the clamping of the cutting insert in which the toolholder's actual position is shown in solid lines and its initial position (FIG. 4A) is shown in dashed lines.
Figure 4C:
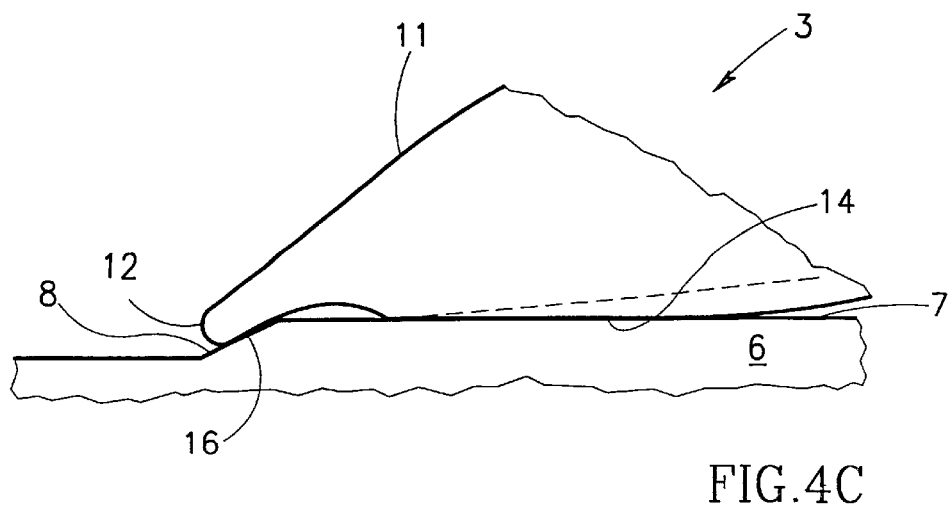
FIG. 4C is an enlarged side view of the toolholder's leading nose portion after the clamping of the cutting insert in which the toolholder's actual position is shown in is solid lines and its intermediate position (FIG. 4B) is shown in dashed lines.

The clamping of the cutting insert 6 is now described with reference to FIGS. 4A–4C. After insertion of the cutting insert 6, the opening force as effected by the insert receiving slot opening key is relaxed, the minor component surface 16 abuts against the cutting insert's auxiliary clamping surface 8, whereupon the natural resiliency of the leading nose portion 12 urges the cutting insert 6 against a back stopper 23 formed in the trailing portion 4b of the insert receiving slot 4, thereby locating the cutting insert 6 in a predetermined position. Once stopped, the minor component surface 16 still abuts against the cutting insert's auxiliary clamping surface 8 whilst the major component surface 14 non-contactingly overlies the cutting insert's major clamping surface 7 (see FIG. 4A).

Clamping of the cutting insert 6 is achieved by a clamping screw 24 received in a clamping screw bore 26 (shown in cross section in FIGS. 1 and 2) having an unthreaded portion 27 formed in the upper clamping jaw 3 and a threaded portion 28 formed in the base jaw 2. On initial application of a clamping force by the clamping screw 24, the leading nose portion 12 undergoes a slight elastic deformation whereby its minor component surface 16 is forcibly slid down the cutting insert's auxiliary clamping surface 8 until the major component surface's leading portion 14A contacts the cutting insert's major clamping surface 7 (see FIG. 4B). On continued application of the clamping force, the upper clamping jaw 3 undergoes a slight elastic deformation whereby its major component surface 14 is brought, at least along a major portion thereof, into clamping contact with the cutting insert's major clamping surface 7 (see FIG. 4C). In this position, the leading nose portion 12 prevents the outward longitudinal displacement of the cutting insert 6 from the insert receiving slot 4 during a cutting operation by outwardly directed unseating forces acting co-directional with the slot 4.

Figure 5:
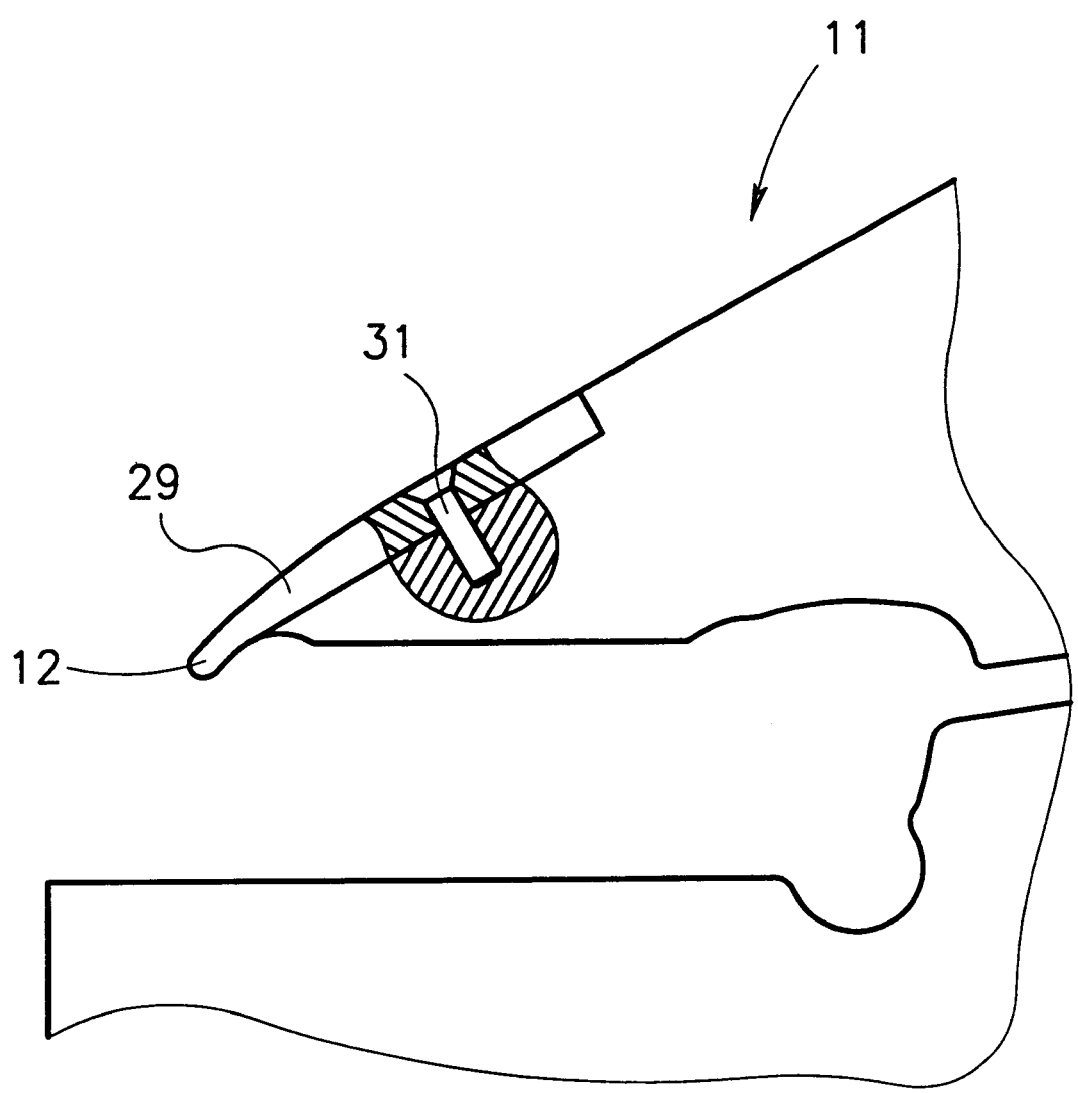
FIG. 5 is an enlarged side view of a toolholderes leading portion with a replaceable nose portion.

While the invention has been described with respect to a limited number of embodiments, it will be appreciated that many variations, modifications and other applications of the invention can be made without departing from the scope of the claims appended hereto. For example, a leading nose portion 12 may be formed on an elongated member 29 secured to a clamping jaw's major leading portion 11 by a fastening screw 31 (see FIG. 5). Also, the invention can be applied to different types of toolholders without restriction to the manner in which a clamping force is applied, for example, it can be applied to a lathe toolholder illustrated and described in U.S. Pat. No. 5,697,271, a circular saw, and the like. Also, a toolholder can be normally open as opposed to normally closed, namely, a cutting insert can be normally inserted without application of an opening force.

What is claimed is:

1. A toolholder for clamping a cutting insert, the toolholder comprising:

a rigid base jaw having an upperside surface;

an upper clamping jaw tapering towards a leading nose portion, said leading nose portion having natural resiliency, said upper clamping jaw having an underside surface with a major component abutment surface substantially co-directional with said upperside surface, a minor component abutment surface associated with said leading nose portion and a longitudinal recess spacing apart the major and minor component abutment surfaces, said minor component abutment surface being forwardly and downwardly directed with respect to said major component abutment surface towards said upperside surface whereby the height of a leading portion of said insert receiving slot is a minimum at said leading nose portion;

said base jaw and said upper clamping jaw having unitary construction and defining therebetween a longitudinally extending insert receiving slot for releasably receiving the cutting insert in a predetermined position;

said leading nose portion being so shaped and dimensioned that the natural resiliency of the leading nose portion initially urges the cutting insert to said predetermined position prior to clamping the cutting insert in said insert receiving slot and prevents outward longitudinal displacement of the cutting insert during a cutting operation.

2. The toolholder according to claim 1 wherein said leading nose portion prevents the insertion of the cutting insert into said insert receiving slot in the absence of a force applied to enlarge an opening of the insert receiving slot.

3. The toolholder according to claim 1, further comprising a clamping screw for screw-clamping a cutting insert in said insert receiving slot, wherein the leading nose portion undergoes elastic deformation upon initial application of a screw-clamping force to clamp a cutting insert retained in the insert receiving slot, and the upper clamping jaw undergoes elastic deformation, upon continued application of a screw-clamping force to clamp said cutting insert retained in the insert receiving slot.

4. The toolholder according to claim 1, further comprising a back stopper formed in said insert receiving slot, the back stopper being configured and dimensioned to abut and prevent further insertion of a cutting insert into the insert receiving slot.

5. A cutting tool assembly comprising:

a toolholder comprising:

a jaw member having unitary construction and comprising a rigid base jaw provided with an upperside surface, and an upper clamping jaw, the upper clamping jaw having a leading portion which tapers towards a leading nose portion, the upper clamping jaw being resiliently displaceable relative to said rigid base jaw upon application of a force to said upper clamping jaw, said upper clamping jaw also having an underside surface with a major component abutment surface substantially co-directional with said upperside surface, a minor component abutment surface associated with said leading nose portion and a longitudinal recess spacing apart the major and minor component abutment surfaces;

a longitudinally extending insert receiving slot defined between the rigid base jaw and the upper clamping jaw, the insert receiving slot having an insert opening at a leading portion thereof, and a back stopper at a trailing portion thereof; wherein a height $h_1$ of the leading portion of the insert receiving slot is a minimum at said leading nose portion, and a spacing between the major component abutment surface and the upperside surface has a height $h_2$, $h_2$ being greater than $h_1$;

a cutting insert having a major clamping surface spaced apart from a front cutting edge of the cutting insert and an auxiliary clamping surface situated between the major clamping surface and the front cutting edge, wherein a height $h_3$ of the cutting insert is a maximum at said major clamping surface, maximum height $h_3$ being greater than minimum height $h_1$; and screw means configured to screw-clamp the cutting insert in said insert receiving slot, wherein the assembly is adjustable between an unassembled position, and an assembled position in which the cutting insert is retained in the insert receiving slot with the leading nose portion of the upper clamping jaw abutting the auxiliary clamping surface of the cutting insert such that the cutting insert is urged against, and abuts, the back stopper.

6. The cutting tool assembly of claim 5, further comprising a rearward extension of the insert receiving slot, and wherein the screw means passes through said rearward extension to urge said rigid base jaw and upper clamping jaw together and thereby clampingly retain the cutting insert in said insert receiving slot.

7. The cutting tool assembly of claim 5, wherein the auxiliary clamping surface is inclined with respect to the major clamping surface.

8. The cutting tool assembly of claim 5, wherein the cutting insert is a double-ended cutting insert formed with front cutting edges at both ends of an upper surface thereof, the cutting insert further being provided with first and second auxiliary clamping surfaces on either side of the major clamping surface.

9. The cutting tool assembly of claim 8, wherein the first and second auxiliary clamping surfaces are inclined in opposite senses with respect to the major clamping surface.

10. A toolholder for clamping a cutting insert, the toolholder comprising:

a jaw member having unitary construction and comprising a rigid base jaw and an upper clamping jaw, the upper clamping jaw having a leading portion which tapers towards a leading nose portion, the upper clamping jaw being resiliently displaceable relative to said rigid base jaw upon application of a force to said upper clamping jaw;

a longitudinally extending insert receiving slot defined between the rigid base jaw and the upper clamping jaw, the insert receiving slot having an insert opening at a leading portion thereof, and a back stopper at a trailing portion thereof; and screw means configured to screw-clamp a cutting insert retained said insert receiving slot, wherein:

a height $h_1$ of the leading portion of the insert receiving slot is a minimum at said leading nose portion, said base jaw has an upperside surface;

said upper clamping jaw has an underside surface with a major component abutment surface substantially co-directional with said upperside surface, a minor component abutment surface associated with said leading nose portion, a spacing between the major component abutment surface and the upperside surface having a height $h_2$, wherein $h_2$ is greater than minimum height $h_1$, and said leading nose portion has natural resiliency and is so shaped and dimensioned that the minor component abutment surface abuts and urges a cutting insert against said back stopper, upon initial insertion of the cutting insert into the insert retaining slot and prior to screw-clamping said cutting insert, the minor component abutment surface also preventing outward longitudinal displacement of the cutting insert during a cutting operation.

* * * * *